S. W. BRAINARD.
BOLT ANCHOR.
APPLICATION FILED JUNE 26, 1912.
1,068,479.
Patented July 29, 1913.
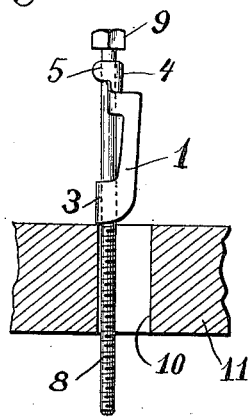
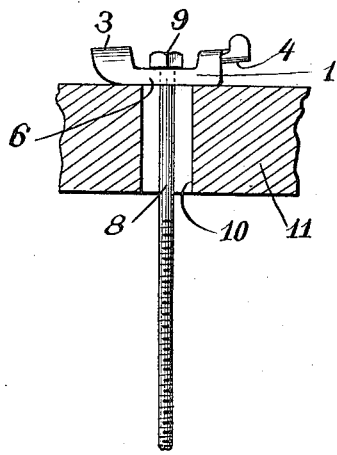
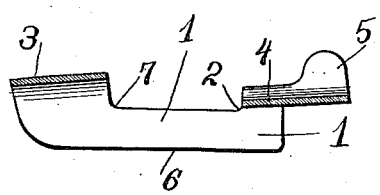
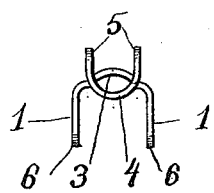
WITNESSES
INVENTOR
Sidney W Brainard
BY
Duncan & Duncan ATTORNEYS

UNITED STATES PATENT OFFICE.

SIDNEY W. BRAINARD, OF AKRON, OHIO, ASSIGNOR TO AUTOMATIC SPRINKLER COMPANY OF AMERICA, OF NEW YORK, N. Y., A CORPORATION OF NEW YORK.

BOLT-ANCHOR.

1,068,479. Specification of Letters Patent. Patented July 29, 1913.

Application filed June 26, 1912. Serial No. 705,997.

*To all whom it may concern:*

Be it known that I, SIDNEY W. BRAINARD, a citizen of the United States, and resident of Akron, county of Summit, and State of Ohio, have made certain new and useful Inventions Relating to Bolt-Anchors, of which the following is a specification, taken in connection with the accompanying drawing, which forms part of the same.

This invention relates especially to bolt anchors by which ordinary bolts may be readily and securely mounted in holes in concrete walls, ceilings, tiling, etc., the bolt anchor being preferably stamped up out of sheet metal and being provided with one or more resilient clamping members to detachably grip the bolt adjacent the head and hold the parts in position during insertion while being readily disengaged by toggle action so that the anchor is brought into holding position in which its seat coöperates with the bolt head.

In the accompanying drawing showing in a somewhat diagrammatic way an illustrative embodiment of this invention, Figure 1 shows the bolt and anchor when being inserted; Fig. 2 shows the parts in normal holding position; Fig. 3 is an enlarged longitudinal sectional view through the anchor; and Fig. 4 is an end view thereof.

The bolt anchor may, if desired, be cheaply and conveniently stamped up or otherwise formed from sheets of steel or the like one-sixteenth of an inch or so thick or may be constructed in any other desired way.

The anchor may be provided with a centrally located bolt aperture 2 between its substantially parallel sides 1, the edges of which as shown in Figs. 2 and 3 act edgewise in bridging the hole 10 and rigidly supporting the bolt head in a suitable seat 7 for the bolt head adjacent the central portion of the anchor. The yoke 3 connects the sides at one end of the anchor and holds them in proper alinement with a suitable bridge 4 connects them at the other end. The anchor is preferably formed with a suitable clamp to resiliently and detachably engage the bolt and if desired this clamp may comprise clamping members 5 adjacent one end of the bridge 4 which is preferably bent downward or recessed as shown in Fig. 4 so as to accommodate the bolt when the parts are in the inserting position shown in Fig. 1.

Under service conditions the bolt 8 is inserted through the bolt aperture 2 in the anchor which is swung into line with the bolt and the clamp forced against the bolt so as to grip it sufficiently to hold the parts in this inserting position shown in Fig. 1 while the bolt and anchor are manually inserted through the hole 10 formed in any desired way in the wall, ceiling, etc., 11. When fully inserted the contact point at the end of the yoke 3 is brought into engagement with the inner edge of the hole as shown in Fig. 1 and a downward pull on the bolt swings the yoke out of contact therewith so as to cause a toggle action between the members forcing the clamp out of engagement with the bolt and allowing the anchor to come into firm holding engagement with the inner flat face of the wall, etc., inside the hole. The head 9 of the bolt, which may be of any desired shape, simultaneously comes into holding engagement with the seat 7 so as to aline the anchor to the desired extent, the substantially straight supports 6 on the sides 1 which may be substantially straight or parallel as shown, being made of sufficient length and size to give proper holding engagement in connection with the concrete or other material with which they coöperate.

This invention has been described in connection with a number of illustrative embodiments, forms, proportions, parts, materials and methods of manufacture, to the details of which disclosure the invention is not of course to be limited, since

What is claimed as new and what is desired to be secured by Letters Patent is set forth in the appended claims.

1. The bolt anchor formed of stamped sheet steel and provided with a bolt aperture partly separating its substantially parallel sides, a yoke connecting said sides and having a projecting contact point at the end of the anchor, a bridge connecting said sides at the other end of said anchor and bent downward to accommodate the bolt and resilient clamping members on the end of said bridge and integral therewith to disengageably grip the shank of a bolt and hold the anchor in inserting position, said sides being formed with an alining seat for the bolt head adjacent said bolt aperture and being formed with substantially straight supports to coöperate with the wall, etc.

2. The bolt anchor formed of stamped sheet metal and provided with a bolt aperture partly separating its sides, a yoke connecting said sides and having a projecting contact point at the end of the anchor, a bridge connecting said sides at the other end of said anchor and resilient clamping members on the end of said bridge and integral therewith to disengageably grip a bolt and hold the anchor in inserting position, said sides being formed with an alining seat for the bolt head adjacent said bolt aperture and being formed with substantially straight supports to coöperate with the wall, etc.

3. The bolt anchor formed of sheet metal and provided with a bolt aperture partly separating its substantially parallel sides, an upwardly bent yoke connecting said sides adjacent one end of the anchor, a downwardly bent bridge connecting said sides adjacent the other end of said anchor to accommodate the shank of the bolt, a seat for the bolt head formed in said sides adjacent said bolt aperture enabling said sides to act edgewise in bridging the hole and holding the bolt in position in said hole and resilient clamping means on said anchor to disengageably grip the shank of the bolt and hold the anchor in inserting position.

4. The bolt anchor formed of sheet metal and provided with a bolt aperture partly separating its sides, a yoke connecting said sides and having a projecting contact point at one end of the anchor, a bridge connecting said sides at one end of said anchor and resilient clamping members to disengageably grip the bolt and hold the anchor in inserting position, said sides being formed with a seat for the bolt head adjacent said bolt aperture.

5. The bolt anchor formed of sheet metal and provided with a bolt aperture, a yoke connecting the sides of the anchor adjacent one end thereof, an oppositely bent bridge connecting said sides adjacent the other end of said anchor and resilient clamping means on said anchor adjacent one end thereof to disengageably grip the shank of a bolt and releasably hold the anchor in inserting position substantially parallel thereto.

6. The bolt anchor formed of sheet metal and provided with a bolt aperture, a yoke connecting the sides at the end of the anchor, a bridge connecting said sides at the other end of said anchor and resilient clamping means on said anchor to disengageably grip the bolt and hold the anchor in inserting position.

7. The bolt anchor provided with a bolt aperture adjacent its middle portion, a yoke having a projecting contact point at the end of the anchor, and integral resilient clamping means on said anchor adjacent one end thereof to disengageably grip the shank of a bolt and hold the anchor in inserting position substantially parallel thereto.

8. The bolt anchor provided with a bolt aperture adjacent its middle portion and resilient clamping means on said anchor adjacent one end thereof to disengageably grip the shank of a bolt and hold the anchor in inserting position substantially parallel thereto.

SIDNEY W. BRAINARD.

Witnesses:
HARRY L. DUNCAN,
LOUIS COHN.

Copies of this patent may be obtained for five cents each, by addressing the "Commissioner of Patents, Washington, D. C."